United States Patent
Tajima (10) Patent No.: US 10,175,904 B2
(45) Date of Patent: Jan. 8, 2019

(54) PROCESSING APPARATUS AND NON-TRANSITORY COMPUTER READABLE MEDIUM FOR SELECTING A MEMORY AREA

(71) Applicant: FUJI XEROX CO., LTD., Tokyo (JP)

(72) Inventor: Yukio Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/602,792

(22) Filed: May 23, 2017

(65) Prior Publication Data

US 2018/0011652 A1     Jan. 11, 2018

(30) Foreign Application Priority Data

Jul. 6, 2016    (JP) ................................ 2016-134370

(51) Int. Cl.
| | |
|---|---|
| G06K 15/00 | (2006.01) |
| G06F 3/06 | (2006.01) |
| H04N 1/00 | (2006.01) |
| H04N 1/32 | (2006.01) |

(52) U.S. Cl.
CPC .......... *G06F 3/0631* (2013.01); *G06F 3/0604* (2013.01); *G06F 3/0673* (2013.01); *H04N 1/00411* (2013.01); *H04N 1/32358* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2008/0215828 A1* | 9/2008 | Caulkins | ............. | G06F 13/1694 711/154 |
| 2008/0222371 A1* | 9/2008 | Caulkins | ............. | G06F 13/1684 711/154 |
| 2011/0043851 A1* | 2/2011 | Tajima | ............... | H04N 1/00347 358/1.15 |
| 2016/0088171 A1* | 3/2016 | Tajima | ............... | H04N 1/00347 358/1.15 |
| 2017/0180599 A1* | 6/2017 | Nitta | ..................... | G06F 3/0608 |

FOREIGN PATENT DOCUMENTS

| | | |
|---|---|---|
| JP | 2002-135602 A | 5/2002 |
| JP | 2007-280264 A | 10/2007 |

* cited by examiner

*Primary Examiner* — Henok A Shiferaw
(74) *Attorney, Agent, or Firm* — Oliff PLC (57) ABSTRACT

A processing apparatus includes a memory, a processor, and a setting processor. The memory has plural memory areas, and the plural memory areas include registered memory areas that are registered to be used, and unregistered memory areas that are not registered to be used. The processor stores input data in a corresponding memory area among the plural memory areas. In response to an instruction to perform a setting process related to a function which uses a memory area, the setting processor executes a setting process including registering a memory area selected from among the unregistered memory areas to use the selected memory area for the function or including presenting the selected memory area to a user as a candidate for the memory area used by the function.

7 Claims, 9 Drawing Sheets

FIG. 2

| LINE | BOX NUMBER |
|---|---|
| LINE 1 | 199 |
| LINE 2 | — |
| ⋮ | ⋮ |

FIG. 3

| BOX NUMBER | REGISTRATION | FLOW DATA |
|---|---|---|
| 001 | REGISTERED | NO DATA |
| 002 | REGISTERED | FLOW 1 |
| ⋮ | ⋮ | ⋮ |
| 100 | UNREGISTERED | — |
| ⋮ | ⋮ | ⋮ |
| 199 | REGISTERED | FORWARDING TO RECIPIENT A |
| ⋮ | ⋮ | ⋮ |

| BOX NUMBER | REGISTRATION | FLOW DATA | ACCESS RIGHT HOLDER |
|---|---|---|---|
| 001 | REGISTERED | NO DATA | a |
| 002 | REGISTERED | FLOW 1 | a, b |
| ⋮ | ⋮ | ⋮ | |
| 100 | UNREGISTERED | — | |
| ⋮ | ⋮ | ⋮ | |
| 199 | REGISTERED | FORWARDING TO RECIPIENT A | |
| ⋮ | ⋮ | ⋮ | |

PROCESSING APPARATUS AND NON-TRANSITORY COMPUTER READABLE MEDIUM FOR SELECTING A MEMORY AREA

CROSS-REFERENCE TO RELATED APPLICATIONS

This application is based on and claims priority under 35 USC 119 from Japanese Patent Application No. 2016-134370 filed Jul. 6, 2016.

BACKGROUND

Technical Field

The present invention relates to a processing apparatus and a non-transitory computer readable medium.

SUMMARY

According to an aspect of the invention, there is provided a processing apparatus including a memory, a processor, and a setting processor. The memory has plural memory areas, and the plural memory areas include registered memory areas that are registered to be used, and unregistered memory areas that are not registered to be used. The processor stores input data in a corresponding memory area among the plural memory areas. In response to an instruction to perform a setting process related to a function which uses a memory area, the setting processor executes a setting process including registering a memory area selected from among the unregistered memory areas to use the selected memory area for the function or including presenting the selected memory area to a user as a candidate for the memory area used by the function.

BRIEF DESCRIPTION OF THE DRAWINGS

An exemplary embodiment of the present invention will be described in detail based on the following figures, wherein.

DETAILED DESCRIPTION

The substantial part of the functional configuration of internal functional components of a multifunction machine 100 according to an exemplary embodiment will be described with reference to FIG. 1. The multifunction machine is a multifunctional apparatus having functions of devices such as a printer, a scanner, a copying machine, and a fax machine.

The multifunction machine 100 includes an operation panel 110, a control unit 120, and a storage device 130 as functional components highly related to control according to this exemplary embodiment. In FIG. 1, functional components included in the multifunction machine 100 but not directly related to control according to this exemplary embodiment, such as a printing mechanism and a scanning mechanism, are not illustrated.

The operation panel 110 includes, for example, an input/output device such as a touch panel display device to present an operation screen to a user and accept an operation input from the user through the operation screen. The operation panel 110 may also include an input device separate from a display device, such as a ten-key pad and a start button for giving an instruction to start the execution of a job.

The control unit 120 executes various information processing operations for controlling the multifunction machine 100. The control unit 120 includes, as information processing functions, a user interface (UI) control unit 121, a setting management unit 123, a fax processing unit 125, an electronic mail transmission unit 127, and a job flow execution unit 129. The control unit 120 has various functions such as a job control function for controlling execution of various jobs such as printing, scanning, and copying jobs, and a function for controlling the operations of the individual components of the multifunction machine 100 to execute these jobs. In FIG. 1, only some of the functions necessary to describe this exemplary embodiment are illustrated. The term "job", as used herein, refers to a process executed by the multifunction machine 100 in accordance with a request from a user, and examples of the process include printing, scanning, and copying.

The UI control unit 121 controls exchange of information with a user (user interface) through a screen displayed on the operation panel 110. The UI control unit 121 displays a UI screen of a graphical user interface (GUI) on the display device of the operation panel 110. Examples of the UI screen generated by the UI control unit 121 include a main menu screen for accepting the selection of a function (such as a copying or scanning function) to be used, and a settings screen for accepting the settings of process parameters which are configured for a selected function. Further, the UI control unit 121 accepts an input made by the user to each UI component on the UI screen. The term "UI component", as used herein, refers to a component used to provide information to the user or to accept the input of information from the user among display components displayed on the UI screen. Specific examples of the UI component include a button, a checkbox, a list (such as a pull-down list), a menu, an input field (for accepting the input of a character string or a numerical value), and a dialog box.

Figure 4:
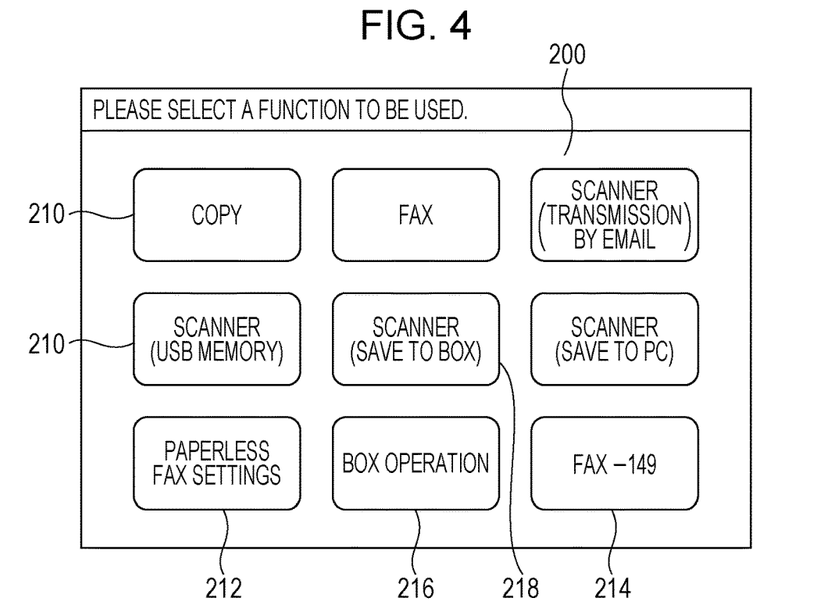
FIG. 4 schematically illustrates an example main menu screen.

FIG. 4 is a schematic diagram of a main menu screen 200 displayed on the operation panel 110 by the UI control unit 121. On the main menu screen 200, buttons (icons) 210, each corresponding to one of the processing functions provided by the multifunction machine 100, are arranged in a matrix. If the number of processing functions is too large to fit within a single screen, the buttons 210 are also displayed in another screen display area displayed by scrolling or page turning. The buttons 210 displayed on the main menu screen 200 include buttons each for invoking a single processing function such as copying or fax transmission, and buttons (not illustrated) each for invoking a composite processing function such as a job flow (described below). In addition, a button such as a button 212 for invoking a settings screen for a certain function ("paperless fax", described below) may also be arranged on the main menu screen 200.

The setting management unit 123 executes control to save in the storage device 130 setting information input to the UI control unit 121 by the user, control to provide the setting information saved in the storage device 130 to a section for controlling execution of a job (such as the job control function described above or the job flow execution unit 129 described below), and any other control. In FIG. 1, line/box association information 132 and box management information 134 (described in detail below) are illustrated as the setting information saved in the storage device 130, by way of example.

The fax processing unit 125 executes information processing for fax transmission and reception. In connection with this exemplary embodiment, the fax processing unit 125 performs a process for causing the printing mechanism to print fax data received by a fax apparatus in the multifunction machine 100 or for saving the fax data to a confidential box (described in detail below) in the storage device 130. The electronic mail transmission unit 127 performs an electronic mail transmission process.

The job flow execution unit 129 executes a composite processing function (job flow) formed by combining processes (jobs) for multiple functions of the multifunction machine 100. For example, a job flow for forwarding a received fax to a preset recipient via electronic mail is constituted by a process for receiving a fax, a process for converting the received fax into a file having a predetermined data format, and a process for generating an electronic mail to be sent to a preset recipient, attaching the received fax file to the electronic mail, and transmitting the resulting electronic mail. A job flow may further include a process provided by a server connected to the multifunction machine 100 via a local area network, the Internet, or the like.

It is possible to set, in the multifunction machine 100, flow data (also referred to as instructions) specifying a job flow. The set flow data is displayable as an icon on a UI screen such as a menu screen. When a user selects the icon and gives an instruction to execute a job flow, the job flow execution unit 129 executes the job flow in accordance with the flow data associated with the icon. It is also possible to set a job flow in a confidential box. If a job flow has been set in a certain confidential box, the job flow execution unit 129 executes the job flow on the data stored in the confidential box at the set execution timing (e.g., periodically or immediately after data has been stored).

Various job flows and instructions of the related art are disclosed in many patent documents such as Japanese Unexamined Patent Application Publication Nos. 2002-135602 and 2007-280264. The job flow execution unit 129 according to this exemplary embodiment may employ such a job flow or instructions of the related art.

The storage device 130 is a non-volatile storage device included in the multifunction machine 100. The storage device 130 stores various setting information.

Figure 1:
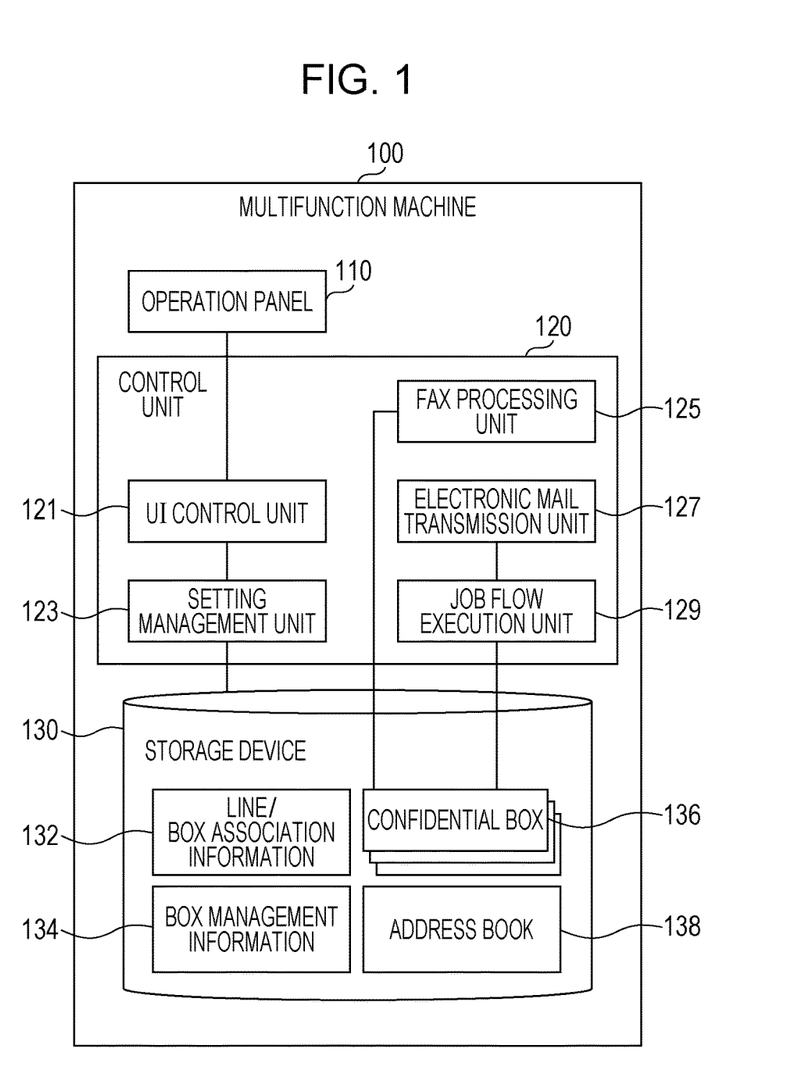
FIG. 1 illustrates an example of a functional configuration of a multifunction machine according to an exemplary embodiment.

In FIG. 1, the line/box association information 132 and the box management information 134 are illustrated as examples of the setting information stored in the storage device 130.

Figure 2:
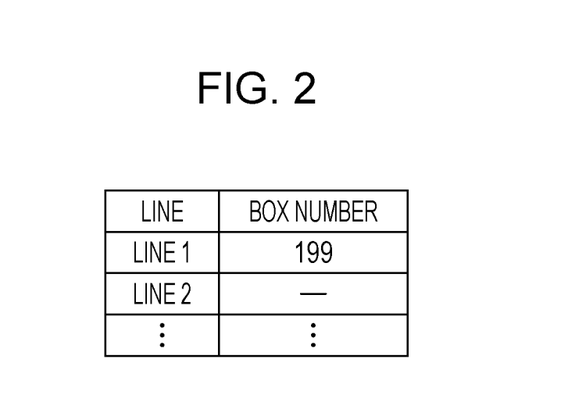
FIG. 2 illustrates an example of line/box association information.

As illustrated by way of example in FIG. 2, the line/box association information 132 is setting information on the correspondence relationship between "line" numbers and "box numbers". A "line" number is information identifying a fax receiving line connection terminal included in the multifunction machine 100, and a "box number" is information identifying a confidential box into which fax data received from the line connected to the connection terminal is to be stored. The box numbers are, for example, serial numbers from 1 to a predetermined maximum number (e.g., 200). In the example illustrated in FIG. 2, fax data received from a line connected to the terminal with "Line 1" is stored in a confidential box 136 with the box number "199" by the fax processing unit 125.

A fax receiving line (a fax receiving line connection terminal) is an example of an input unit included in the multifunction machine 100 to accept the input of data. Other examples of the input unit included in the multifunction machine 100 include a scanner (i.e., an input unit that accepts image data obtained as a result of reading a document) included in the multifunction machine 100, and an interface that accepts the input of print data from a remote computer via a network.

Figure 3:
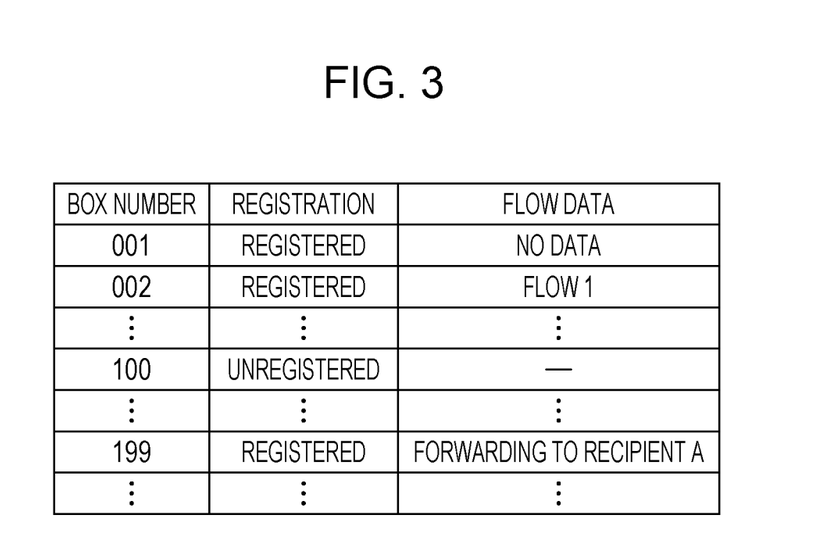
FIG. 3 illustrates an example of box management information.

The box management information 134 is constituted by pieces of management information on the individual confidential boxes within the storage device 130.

The box management information 134 includes, for each confidential box, the box number of the confidential box and various attribute information on the confidential box. In the example illustrated in FIG. 3, a management information record for each confidential box includes a box number, a "registration" flag, and "flow data".

The "registration" flag is a flag indicating whether the confidential box with the corresponding box number is a registered confidential box that has been registered to be used or an unregistered confidential box. A user who desires to use a new confidential box selects a confidential box to be used from among confidential boxes with box numbers for which the values of the "registration" flags indicate "unregistered". When the user or a mechanical manager of the multifunction machine 100 registers the selected confidential box for use (e.g., sets an attribute item such as a password), the "registration" flag of the confidential box is set to "registered".

The "flow data" is an item indicating information on the job flow associated with the corresponding confidential box. In this item, instructions (or flow data) describing the content of the process of the job flow may be registered or flow identification information identifying the instructions may be registered.

The "registration" flag and "flow data" illustrated in FIG. 3 are exemplary attribute items for a confidential box, and the box management information 134 may include other attribute items.

A confidential box 136 is a memory area reserved in the storage device 130. The storage device 130 may have multiple confidential boxes 136 registered therein. A password may be set for each of the confidential boxes 136, and only a person who knows the password may be able to use the confidential box 136. Alternatively, a person who has an access right may be set for each of the confidential boxes 136, and only a person authenticated as having the access right may be able to use the confidential box 136. Any other method of use, such as storing data received from a receiving line in the confidential box 136, as in the example described previously, without setting any specific user or password for each of the confidential boxes 136, is also available. For example, in the storage device 130, a capacity of up to the maximum number of confidential boxes 136 that can be registered is reserved for confidential boxes. Various confidential boxes of the related art disclosed in many patent documents such as Japanese Unexamined Patent Application Publication Nos. 2002-135602 and 2007-280264, described above, may be used for the confidential boxes 136, and such a confidential box management technique of the related art may be used in this exemplary embodiment.

The storage device 130 also stores an address book 138. The address book 138 has registered therein, for each recipient, information necessary to transmit data to the recipient (a protocol, recipient-specifying information such as an address, and any other necessary information). The address book 138 is not limited to an address book supporting a single transfer protocol such as electronic mail, and may support plural protocols such as Simple Mail Transport Protocol (SMTP), File Transfer Protocol (FTP), and Server Message Block (SMB). In this case, any one of the plural protocols is set for each recipient as a protocol to be used for forwarding data to the recipient.

In some cases, a comparatively complex process is defined by using the confidential box or job flow function of the multifunction machine 100 and is executed by the multifunction machine 100. One example of the process is "paperless fax forwarding". The process for "paperless fax forwarding" is a process for forwarding fax data received from a preset receiving line to a preset forwarding destination. This process is implemented by, for example, a combination of a paperless fax function and a job flow for data forwarding.

The paperless fax function is a function for storing fax data received from a preset receiving line in a preset confidential box. Received fax data from a receiving line for which settings for using the paperless fax function have been made is not directly printed or output but is stored in a confidential box. Fax data stored in a confidential box by using the paperless fax function is later displayed on a UI screen of the multifunction machine 100 or on a personal computer (PC) or printed and output in accordance with an instruction given from a user. The confidential box at the destination paperless fax storage is associated with a job flow specifying a process for forwarding data in the confidential box to a preset forwarding destination to implement paperless fax forwarding.

Traditionally, to use such a comparatively complex process, a user has to separately open individual settings screens for individual functions constituting the process and set necessary items while referring to a manual or the like. For example, paperless fax forwarding requires setting operations such as creating (newly registering) a confidential box, creating a job flow for data forwarding, associating the created job flow with the confidential box, associating a receiving line with the confidential box, enabling the receiving line, and disabling the provision of a notification to the user in response to storage of data (a received fax) in the confidential box (no notification is required since the stored fax is forwarded). The user is traditionally required to understand from the manual or the like that these setting operations are necessary and to find out and display a settings screen for each of the setting operations from a hierarchical structure on the UI screen of the multifunction machine 100 to configure settings on the settings screen.

In this exemplary embodiment, in contrast, a so-called portal screen is provided to configure the settings of such a comparatively complex process. The portal screen shows fields for inputting setting items necessary for the process and links (implemented as icons or buttons, for example) for invoking necessary settings screens. In the following description, a settings screen used to configure the settings of the "paperless fax forwarding" function out of various functions (services) provided by the multifunction machine 100 is taken as an example.

Figure 5:
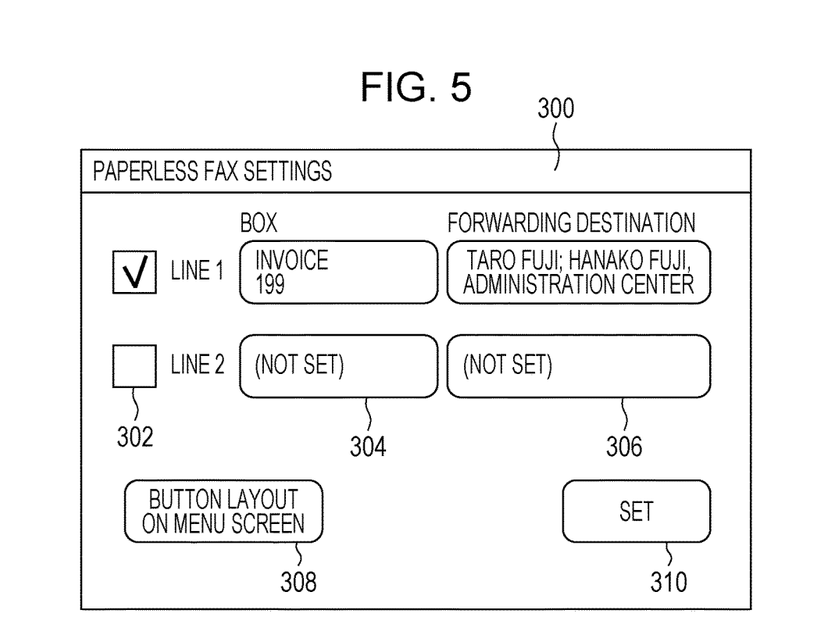
FIG. 5 schematically illustrates an example settings portal screen.

FIG. 5 is a schematic diagram of a settings portal screen 300 for "paperless fax forwarding", which traditionally requires individual opening of several settings screens to configure settings on the settings screens. A person (hereinafter referred to as a "setter") who is to configure the settings of "paperless fax forwarding", for example, a mechanical manager of the multifunction machine 100 or a typical user, presses a "paperless fax settings" button 212 on the main menu screen 200 (see FIG. 4) to invoke the settings portal screen 300.

On the settings portal screen 300, for each of the receiving line connection terminals included in the multifunction machine 100, a checkbox 302, a box settings button 304, and a forwarding destination settings button 306 are arranged in a line in this order from left to right. This arrangement supports a flow of processes of storing fax data received from a line in a confidential box and forwarding the stored data to a forwarding destination. On the settings portal screen 300, a number of rows of UI components starting with the checkbox 302, equal to the number of receiving line connection terminals included in the multifunction machine 100, are arranged.

The checkbox 302 is a UI component for selecting a fax receiving line to which paperless fax is applied. In the example illustrated in FIG. 5, "Line 1" is selected as an object to which paperless fax is applied.

The box settings button 304 is a UI component for setting a confidential box into which fax data received from the corresponding line is to be stored. In the illustrated example, in response to pressing of the box settings button 304, a box settings screen 320 illustrated by way of example in FIG. 6 (described in detail below) is opened. The setter sets necessary items on the box settings screen 320, thereby allowing the set box name or box number to be displayed within the box settings button 304 on the settings portal screen 300.

The forwarding destination settings button 306 is a UI component for setting a forwarding destination of fax data received from the corresponding line. In the illustrated example, in response to pressing of the forwarding destination settings button 306, a forwarding destination settings screen 340 illustrated by way of example in FIG. 8 (described in detail below) is opened. The setter sets necessary items by using the forwarding destination settings screen 340, thereby allowing the content of the settings such as the name of the forwarding destination, to be displayed within the forwarding destination settings button 306 on the settings portal screen 300.

The settings portal screen 300 further includes a button layout instruction button 308 and a setting completion button 310. The button layout instruction button 308 is a button for laying out on the main menu screen 200 a button for opening a confidential box (with the box number "149", for example) shown on the settings portal screen 300. The setter presses the button 308, thereby allowing the UI control unit 121 to lay out on the main menu screen 200 a button 214 (see FIG. 4) for opening a screen to display the content of the confidential box. In the example illustrated in FIG. 4, the name "FAX-149" appears on the button 214. This name indicates the confidential box with the box number "149" in which fax data is stored. In response to pressing of the button 308, a fax data list stored in the confidential box with the box number "149" is displayed on a screen. The setter presses the setting completion button 310, thereby allowing the setting management unit 123 to reflect the content of the settings displayed on the settings portal screen 300 (i.e., the combination of the line, the confidential box, and the forwarding destination information) in a setting information group in the storage device 130. For example, the correspondence relationship between the number of the line for which the checkbox 302 is checked and the number of the confidential box set in association with the line is reflected in the line/box association information 132 (see FIG. 2). Further, the setting management unit 123 creates flow data of a job flow for data forwarding in which the forwarding destination set by using the forwarding destination settings button 306 is reflected, and registers the created flow data in management information on the corresponding confidential box (i.e., the confidential box set by using the box settings button 304) in the box management information 134 (see FIG. 3). Flow data may be created by, for example, associating a template of a job flow for data forwarding with the settings portal screen 300 and adding, by the setting management unit 123, the content of the setting in the forwarding destination settings button 306 to a corresponding blank area of the template.

An example of the box settings screen 320 will now be described with reference to FIG. 6.

A number input field 322 on the box settings screen 320 is a field for inputting a box number of a confidential box into which received fax data is to be stored. If an existing confidential box (i.e., a registered confidential box) is used for paperless fax, the setter inputs the number of the confidential box in the number input field 322.

An automatic input button 324 is a button for invoking a process for automatically inputting a box number of an unregistered confidential box (an "unused number") to the number input field 322. In response to pressing of the automatic input button 324, the setting management unit 123 determines an unused number from the box management information 134 and inputs the determined unused number to the number input field 322.

The setting management unit 123 may randomly select an unused number to be input to the number input field 322 or may select an unused number in accordance with a predetermined standard.

For example, an unused number regarding a confidential box to be used for "paperless fax forwarding" may be selected in accordance with a standard in which a larger box number (i.e., a box number positioned later when the box numbers are arranged in ascending order) is selected with higher priority. The term "selecting a larger box number with higher priority" refers to being more likely to select a larger box number when plural unregistered box numbers are present (i.e., the probability of a number being selected monotonically increases as the number increases). In an extreme example of this standard, the largest unused number is automatically selected.

Figure 7:
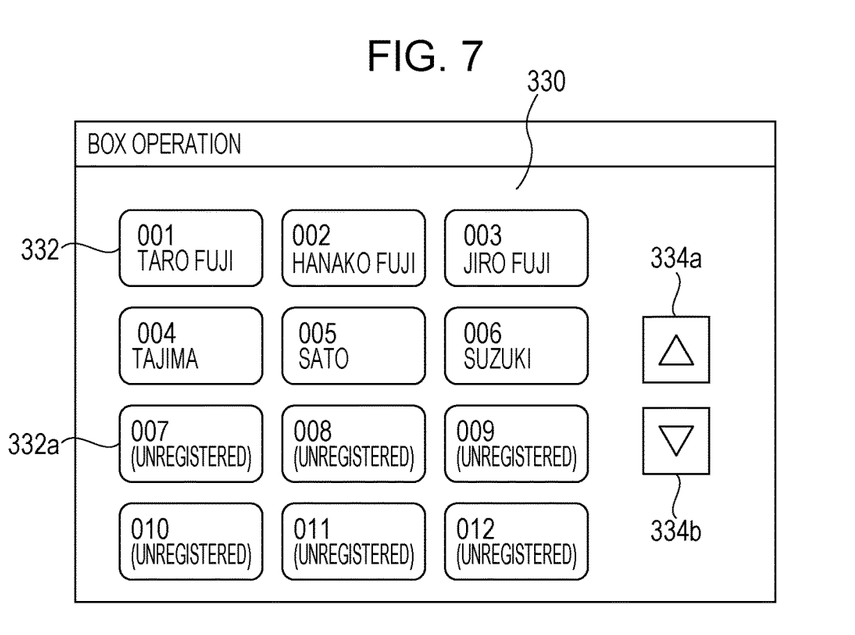
FIG. 7 schematically illustrates an example confidential box selection screen.

Such a standard as described above is used for "paperless fax forwarding" for the following reason. A user who is to operate a confidential box presses a "box operation" button 216 on the main menu screen 200 (see FIG. 4) to open a confidential box selection screen 330 illustrated by way of example in FIG. 7, and searches for and presses the desired one of confidential box icons 332 displayed on the selection screen 330 to open the desired confidential box. On the selection screen 330, the icons 332, the number of which fits within the selection screen 330, each icon showing a box number (e.g., "001") and a box name (e.g., "Taro Fuji" or "unregistered" for an unregistered confidential box, such as that on an icon 332a), are arranged (in the example illustrated in FIG. 7, 12 icons are arranged) in order of box numbers from least to greatest. That is, in the illustrated example, the box numbers indicate the numerical order in which the confidential box icons 332 are displayed on the selection screen 330. Since box numbers starting with 1 up to several hundred exist, display of the icons with the box numbers requires an operation such as an operation of pressing a scrolling button 334a or 334b to scroll through the display range of the selection screen 330 or an operation of turning pages to be displayed on the selection screen 330. Selecting a confidential box having a large number requires repeating the screen scrolling or page turning to display the icon having this number on the selection screen 330 and thus takes time. Thus, the larger the number of the confidential box that the user desires to open and perform operations on (e.g., to print data in the opened confidential box), the longer the time taken to search for the confidential box, which is inconvenient.

In "paperless fax forwarding", in contrast, fax data stored in a confidential box is forwarded to a designated forwarding destination and thus no data is typically left in the confidential box. In this case, a confidential box is primarily intended to be associated with a job flow for a forwarding process, and, in terms of typical usage, it is uncommon for a user to open a confidential box and perform operations on the confidential box. For this reason, no problem occurs if a confidential box for "paperless fax forwarding" is displayed later on a box selection screen. For this purpose, conversely, preferentially selecting a confidential box having a large number (i.e., a confidential box displayed later) allows a confidential box displayed earlier to be left for ordinary purposes (e.g., accumulating data in the confidential box, opening the confidential box, and performing operations on the confidential box).

A box name input field 326 is a UI component that accepts the input of the name ("box name") of the confidential box to be set.

A checkbox 328 is a UI component that accepts the designation of whether to delete data (document) stored in the confidential box to be set after the retrieval of the data (document) from the confidential box for a process such as a forwarding process. If the checkbox 328 is checked, data is deleted from the confidential box after retrieval.

A checkbox 329 is a UI component that accepts the designation of whether to automatically start forwarding of data stored in the confidential box to be set. If the checkbox 329 is checked, the data stored in the confidential box is forwarded automatically (i.e., without any instruction given by a user) in accordance with the job flow for a forwarding process. If the checkbox 329 is not checked, the stored data is forwarded after a forwarding instruction has been given from a user.

Figure 8:
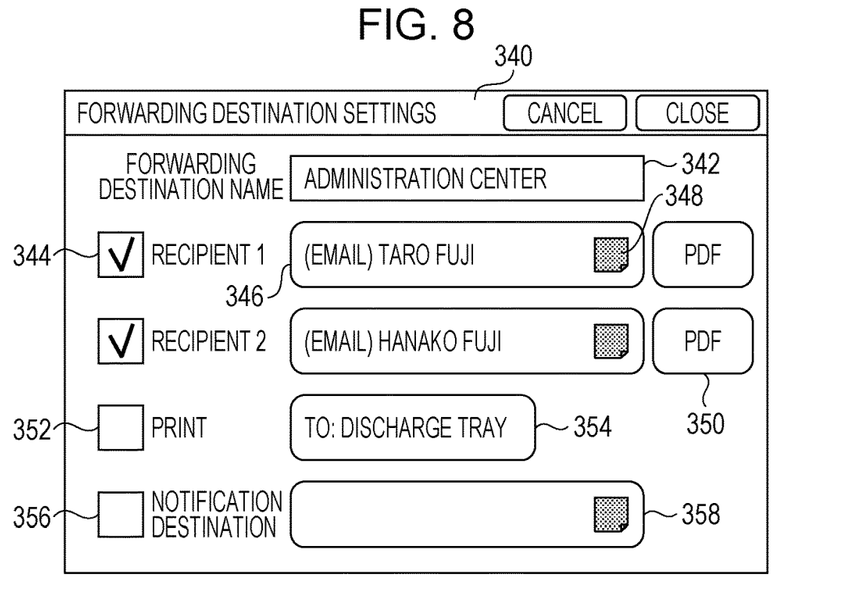
FIG. 8 schematically illustrates an example forwarding destination settings screen.

An example of the forwarding destination settings screen 340 will now be described with reference to FIG. 8.

On the forwarding destination settings screen 340, a forwarding destination name input field 342 is a field for accepting the input of the name of the forwarding destination ("forwarding destination name"). Two forwarding destination (recipient) setting rows are arranged below the forwarding destination name input field 342. On the forwarding destination settings screen 340, two specific forwarding destinations are set within a group indicated by one forwarding destination name.

Each forwarding destination setting row includes a checkbox 344, a forwarding destination input field 346, and a file format selection button 350. If the checkbox 344 is checked, the input content of the field or button in the forwarding destination setting row is enabled.

The forwarding destination input field 346 is a UI component that accepts the input of forwarding destination information. The forwarding destination information is information on a forwarding destination or information necessary to forward data to the forwarding destination. This information includes a protocol used for data forwarding and information specifying the forwarding destination, such as the address. If the protocol requires information other than the address to forward data (such as when it is necessary to authenticate the forwarding destination by using a password or the like), the necessary information is also included in the forwarding destination information.

The forwarding destination input field 346 has an address book invoking button 348. In response to pressing of the button 348, the setting management unit 123 displays the address book 138 stored in the storage device 130 on a screen. The user selects the desired recipient from a display screen of the address book 138 which is displayed on the operation panel 110 in response to pressing of the button 348. Through this operation, information on the selected recipient is input to the forwarding destination input field 346.

The file format selection button 350 is a UI component for accepting the selection of a file format of data to be forwarded. In response to pressing of the button 350, a format selection screen that shows options of file formats (such as Portable Document Format (PDF) and Tagged Image File Format (TIFF)) is displayed on the operation panel 110 and the user selects a file format on this screen. When the selection is completed, the format selection screen is closed and the forwarding destination settings screen 340 is displayed. At this time, a character string or icon indicating the selected file format is displayed within the button 350.

A checkbox 352 is a UI component that accepts the selection of whether to print the forwarded data. The checkbox 352 is checked to not only forward but also print the data stored in the confidential box. A discharge destination selection field 354 is a field for accepting the selection of the discharge destination of a printing result obtained as a result of printing the forwarded data.

A checkbox 356 is a UI component that accepts the selection of whether to notify the designated notification destination (e.g., by electronic mail) that data has been stored in the confidential box. If the checkbox 356 is checked, the control unit 120 transmits, when data is stored in the corresponding confidential box, a notification indicating the storage of the data to a notification destination set in a notification destination setting field 358. The notification destination setting field 358 is a field for accepting the setting of information on the notification destination to which the notification is provided, and, as in the forwarding destination input field 346, an address book may be used to accept the selection of a notification destination.

The UI screens for paperless fax settings have been described.

A setter who is to configure new settings of paperless fax forwarding for an unused receiving line first presses the button 212 on the main menu screen 200 (FIG. 4) to open the settings portal screen 300 (FIG. 5). Then, the setter checks the checkbox 302 for the line. Then, the setter presses the box settings button 304 in the same row to open the box settings screen 320 (FIG. 6) to register the confidential box at the storage destination, and then presses the forwarding destination settings button 306 to open the forwarding destination settings screen 340 (FIG. 8) to configure the setting of a forwarding destination. The setting operation described above allows fax data received from the line to be automatically forwarded to the set forwarding destination. Whereas the setter himself/herself is traditionally required to search for and individually open several settings screens which are necessary to configure settings, this exemplary embodiment enables these necessary settings screens to be invoked from the settings portal screen 300.

In the foregoing description, the settings of paperless fax forwarding are configured for an unused line by using the settings portal screen 300. The settings portal screen 300 is also available for changing the settings configured for a line for which the settings of paperless fax forwarding have been made. In this case, a person who is to change the settings opens the box settings screen 320 by using the box settings button 304 on the settings portal screen 300 with which the settings have been made and changes the content of the settings. Alternatively, the person opens the forwarding destination settings screen 340 by using the forwarding destination settings button 306 on the settings portal screen 300 with which the settings have been made and changes the content of the settings. The setter may also be able to change the settings on the box settings screen 320 by inputting the number of an existing confidential box (i.e., a confidential box for which various settings have been completed) to the number input field 322. In this case, a process corresponding to the settings for the existing confidential box (such as whether to forward data, the forwarding destination, and whether to print and output data) is applied to fax data stored in the confidential box from the corresponding line.

While the box settings button 304 is displayed on the settings portal screen 300 illustrated by way of example in FIG. 5, the box settings button 304 may be optional. For example, if the selection of a storage destination of received fax data from among existing confidential boxes is not permitted and the storage destination is always selected from among unused or available confidential boxes, the settings portal screen 300 may not contain the box settings button 304. In this case, the setting management unit 123 automatically selects a confidential box to be used for paperless fax from among unused or available confidential boxes and associates the selected confidential box with a line or a job flow (forwarding destination).

The settings portal screen 300 is also available for settings in a case where received fax data is only accumulated in the confidential box 136 but is not forwarded. In this case, it is desirable for the setter to only select a line (the checkbox 302) and set a confidential box by using the box settings button 304, without configuring the setting of forwarding destination information by using the forwarding destination settings button 306, before pressing the setting completion button 310.

In paperless fax without forwarding, fax data accumulated in a confidential box is often operated from the operation panel 110. In this case, selecting a confidential box having a number displayed earlier on a confidential box selection screen as a confidential box to be used takes less time for the user to search for the confidential box by performing an operation such as scrolling or page turning. This is opposite to the case where paperless fax forwarding that involves automatic forwarding, described above, is performed. It is conversely inconvenient if, in response to pressing of the automatic input button 324 on the box settings screen 320 (FIG. 6) which is opened when the box settings button 304 is pressed, an unused number is selected in accordance with the same standard as that for paperless fax forwarding. That is, whereas paperless fax forwarding employs a standard in which an unused number having a large value is selected with higher priority, paperless fax involving no forwarding employs a different standard in order to address the problem in which the selection of a confidential box in accordance with the same standard as that for paperless fax forwarding requires more operations such as scrolling to display the selected confidential box on a selection screen and takes more time.

Figure 9:
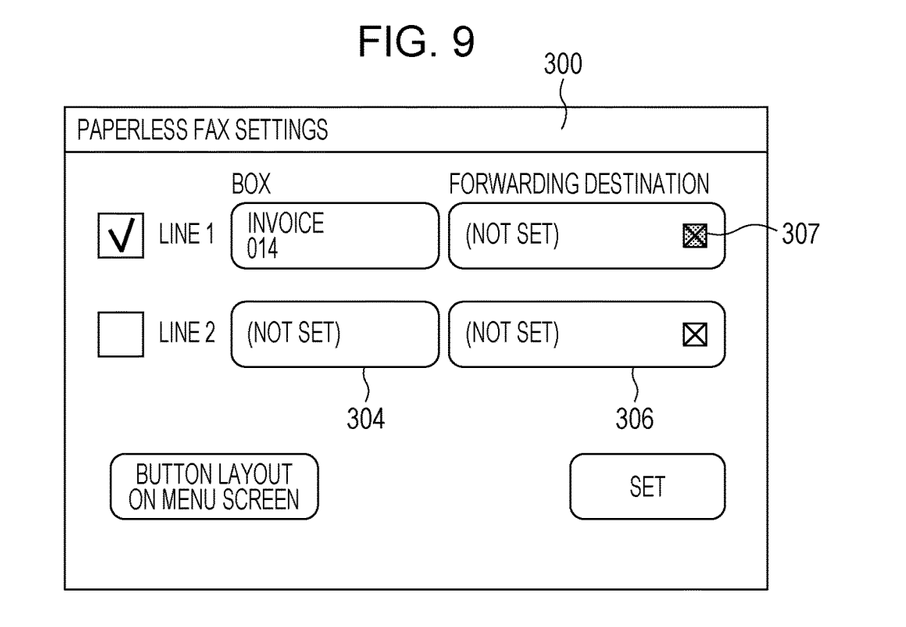
FIG. 9 schematically illustrates another example settings portal screen.

For one example, in paperless fax involving no forwarding, in response to pressing of the automatic input button 324, the setting management unit 123 may select an unused number in accordance with a standard in which, conversely to that in paperless fax involving forwarding, a lower (smaller) unused number is selected with higher priority. In order to determine whether paperless fax for which the setter is to configure the settings involves forwarding, the settings portal screen 300 may include a UI component that accepts the selection of whether to forward fax data stored in a confidential box. For example, in an exemplary modification of the settings portal screen 300 illustrated in FIG. 9, the forwarding destination settings button 306 includes a "no forwarding" checkbox 307. The setter checks the checkbox 307 to express their intention to configure the settings of paperless fax involving no forwarding. When the corresponding box settings screen 320 is opened with the checkbox 307 checked and the automatic input button 324 is pressed, the setting management unit 123 selects an unused number in accordance with a standard in which a small number is selected with high priority, and inputs the selected number to the number input field 322.

In the example described above, the setter inputs to the number input field 322 the number of a confidential box to be used for the paperless fax forwarding function or presses the automatic input button 324 to cause the setting management unit 123 to automatically select the number of the confidential box. However, this is merely an example.

For another example, a user who is to use the multifunction machine 100 may be authenticated and, when the user is to configure the settings of the paperless fax forwarding function, the number of a confidential box 136 for which the user has an access right may be presented as an option (candidate) of a box number to be input to the number input field 322.

Figure 10:
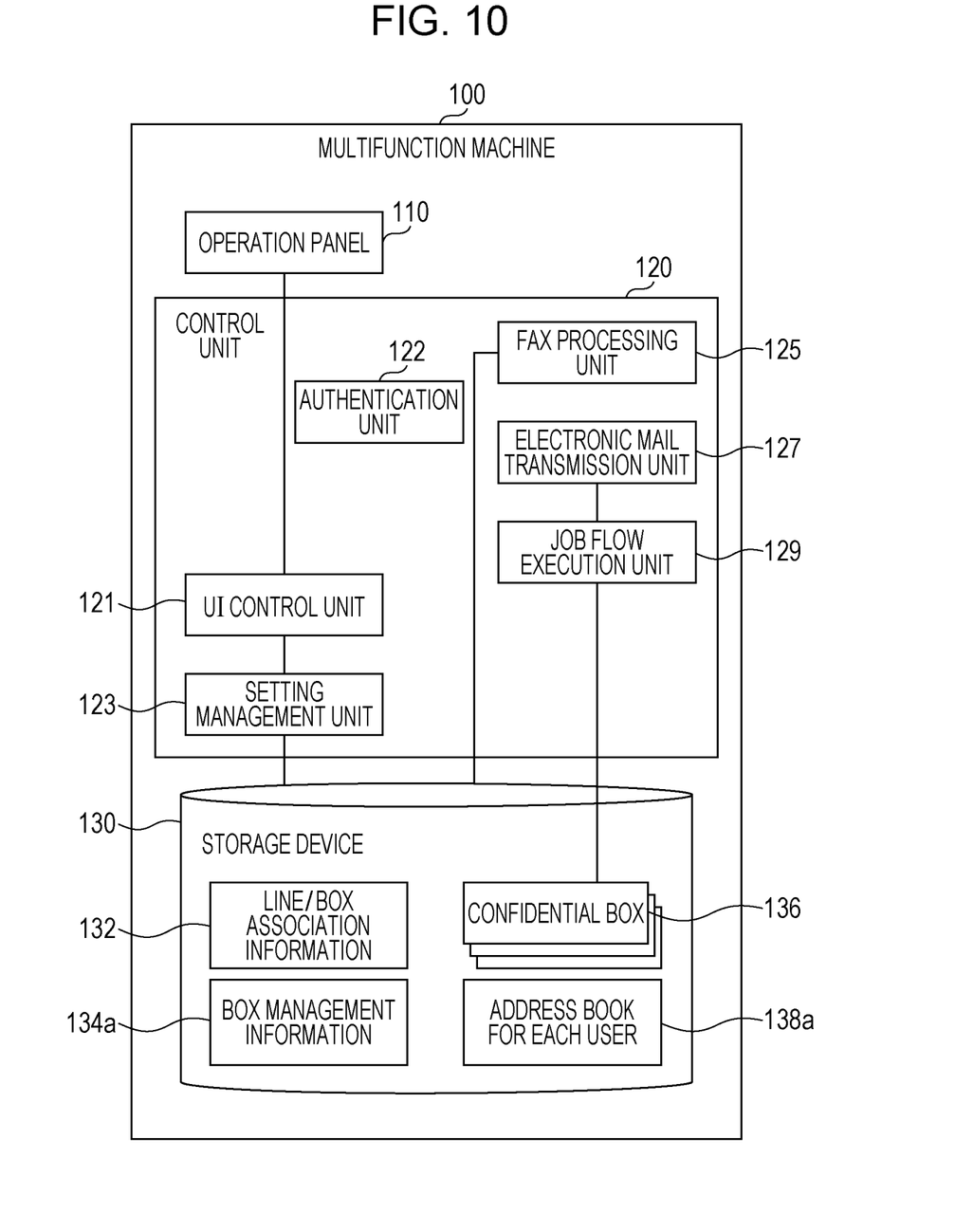
FIG. 10 illustrates an example functional configuration of a multifunction machine including an authentication unit.

As illustrated in FIG. 10, in the illustrated example, the control unit 120 of the multifunction machine 100 includes an authentication unit 122. The authentication unit 122 performs a process for authenticating a user who is to use the multifunction machine 100. The method for user authentication is not limited to a specific one. Any of various methods such as a method for prompting the input of a user ID and a password and a method for reading an ID card carried by the user (e.g., an ID card that incorporates an integrated circuit (IC) chip storing authentication information) may be used.

Figure 11:
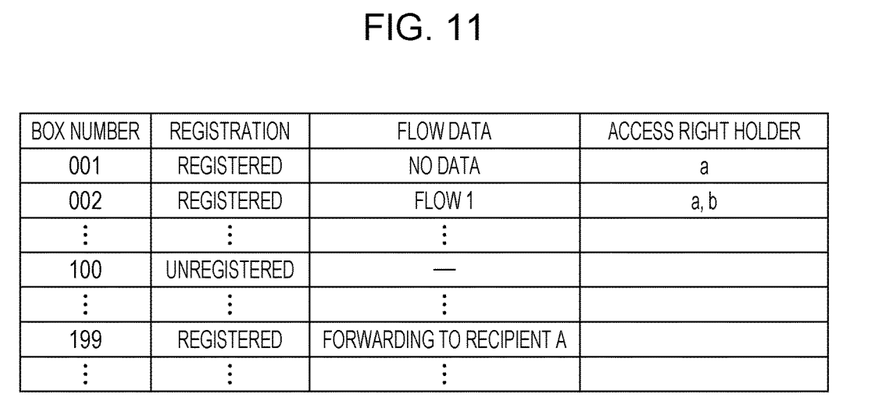
FIG. 11 illustrates an example of box management information including information on access right holders.

In the illustrated example, furthermore, a box management information 134a contains, in association with the box number of a confidential box 136, a user ID of a person who has an access right for the confidential box 136 (i.e., a person who has a right to open the confidential box 136 and perform operations on the confidential box 136). Plural persons may have an access right for a single confidential box 136. The setting of a person who has an access right for a confidential box 136 may be optional. For example, a password for a confidential box 136, instead of a person who has an access right for the confidential box 136, may be set, and a user who has input the password may be authorized to open the confidential box 136. In this case, it is not necessary to set a person who has an access right for the confidential box 136.

Figure 6:
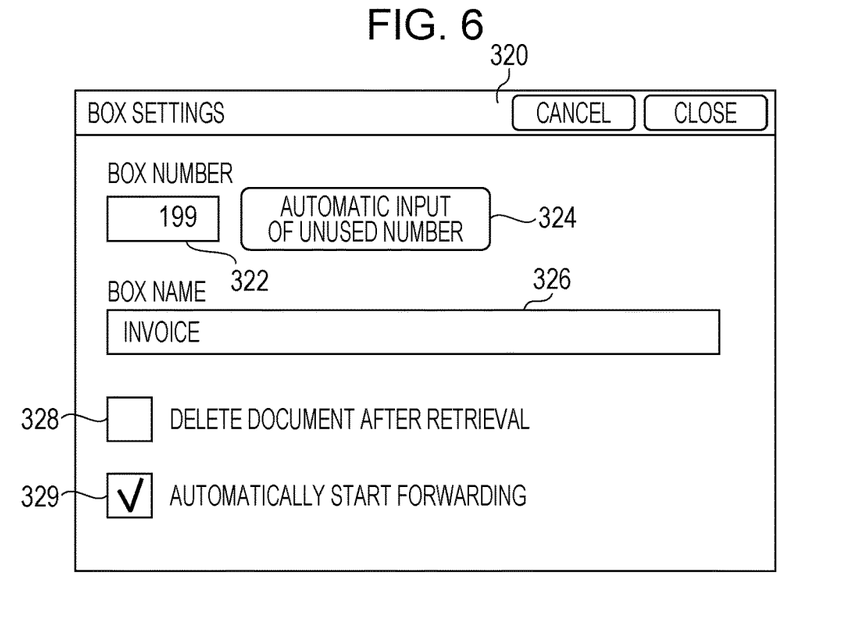
FIG. 6 schematically illustrates an example box settings screen.
Figure 12:
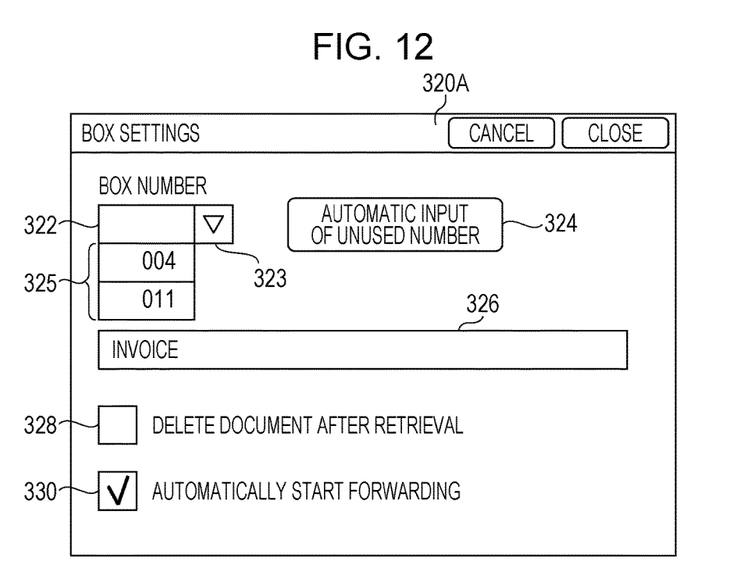
FIG. 12 schematically illustrates another example box settings screen.

In this example, the setting management unit 123 (and the UI control unit 121) displays a box settings screen 320A illustrated by way of example FIG. 12, instead of the box settings screen 320 illustrated by way of example in FIG. 6, on the operation panel 110. The box settings screen 320A is different from the box settings screen 320 illustrated in FIG. 6 in that the box settings screen 320A includes a pull-down button 323 and a pull-down menu 325, which is displayed in response to pressing of the pull-down button 323.

Consideration is given to the case where a user opens the box settings screen 320A on the operation panel 110 through the settings portal screen 300 after the user has successfully been authenticated by the authentication unit 122. The user who desires to use an existing confidential box 136 for which the user has an access right as the destination paperless fax storage presses the pull-down button 323. Then, the setting management unit 123 determines, from the box management information 134a (see FIG. 11), the box number of the confidential box 136 for which the user ID of the user is included as that of a person who has an access right, and displays the pull-down menu 325 in which the determined box number is presented as an option. The user selects the desired box number from the pull-down menu 325. The selected box number is input to the number input field 322.

When the user desires to use an unregistered confidential box 136 instead of an existing confidential box 136 as the destination paperless fax storage, as in the example described above with reference to FIG. 6, automatic selection of an unused number by using the automatic input button 324 is also available.

If a box number input to the number input field 322 by a user through a keyboard indicates a confidential box 136 for which the user does not have an access right, the setting management unit 123 may display on a screen a message indicating that the input number is not available.

The result of user authentication may be used to present options of a forwarding destination on the forwarding destination settings screen 340. In this case, the storage device 130 stores an address book 138a (see FIG. 10) for each user. The storage device 130 may further store an address book shared by persons who operate the multifunction machine 100. Consideration is given to the case where a user who has successfully been authenticated opens the forwarding destination settings screen 340 (see FIG. 8) through the settings portal screen 300. In response to pressing of the address book invoking button 348 on the forwarding destination settings screen 340, the setting management unit 123 displays the address book 138a for the user on a screen and accepts the selection of a forwarding destination. Alternatively, a common address book available for any user may be invoked to address the absence of the recipient desired by the user in the address book 138a for the user.

While a description has been given taking paperless fax settings as an example, the settings portal screen 300 is also applicable to any composite function other than paperless fax in which a great diversity of functions of the multifunction machine 100 (and an external server associated with the multifunction machine 100, if any) are combined. For example, a settings portal screen for a composite function in which fax data received by the multifunction machine 100 is transmitted to an optical character recognition (OCR) server and text data obtained as a result of OCR, which is returned from the OCR server, is registered in a document management system in association with the original fax data is as follows. On this settings portal screen, similarly to the settings portal screen 300 for paperless fax described above, UI components for selecting a receiving line, selecting a confidential box to be used, and setting a job flow to be associated with the confidential box are arranged. A detailed flow settings screen is invoked from the UI component for setting a job flow, and an OCR server to be used, a document management system at the registration destination, and so on are selected on the flow settings screen.

The function of the automatic input button 324 is also applicable to settings other than the paperless fax settings. For example, a settings screen for a composite function ("scanner (save to box)" function) for saving, in a confidential box, data obtained as a result of scanning using the scanner function of the multifunction machine 100 may include a UI component similar to that of the automatic input button 324.

Figure 13:
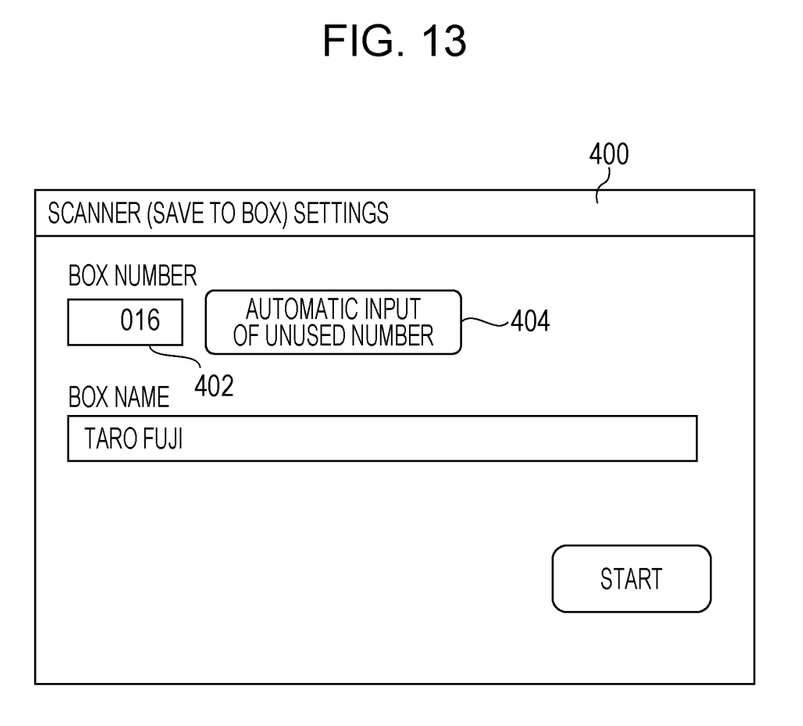
FIG. 13 schematically illustrates an example settings screen for a scanner (save to box) function.

FIG. 13 illustrates an example of this settings screen. A settings screen 400 illustrated in FIG. 13 is displayed in response to pressing of a "scanner (save to box)" button 218 on the main menu screen 200 (see FIG. 4). A user who performs scanning inputs to a number input field 402 a number of a confidential box available to the user, if any, and sets a document on a document feeder. Thereafter, the user presses a "Start" button. A user who has no confidential box available, on the other hand, presses an automatic input button 404 to register an unregistered confidential box for storage of the current scanning result. Since a confidential box in which a scanning result is stored is likely to be opened through the operation panel 110 for operations, the setting management unit 123 selects an unused number in response to pressing of the automatic input button 404 in accordance with a standard in which a lower number is selected with higher priority. When an unused number is input to the number input field 402 in response to pressing of the automatic input button 404 and the "Start" button is pressed, the setting management unit 123 changes the status of the "registration" flag of the unused number in the box management information 134 (see FIG. 3) to "registered". Further, the control unit 120 executes scanning and saves data of the scanning result in the newly registered confidential box.

In the foregoing description, settings for a composite function in which a confidential box is combined with any other function (such as fax receiving or a job flow) are taken as an example. However, a settings screen for using the function of a confidential box alone, that is, a screen for registering a new confidential box, may also include a UI component equivalent to the automatic input button 324 described above. The function of a confidential box alone is a function for storing data which is determined to be stored in the confidential box by a user or accepting an operation to be performed on the stored data by a user.

Figure 14:
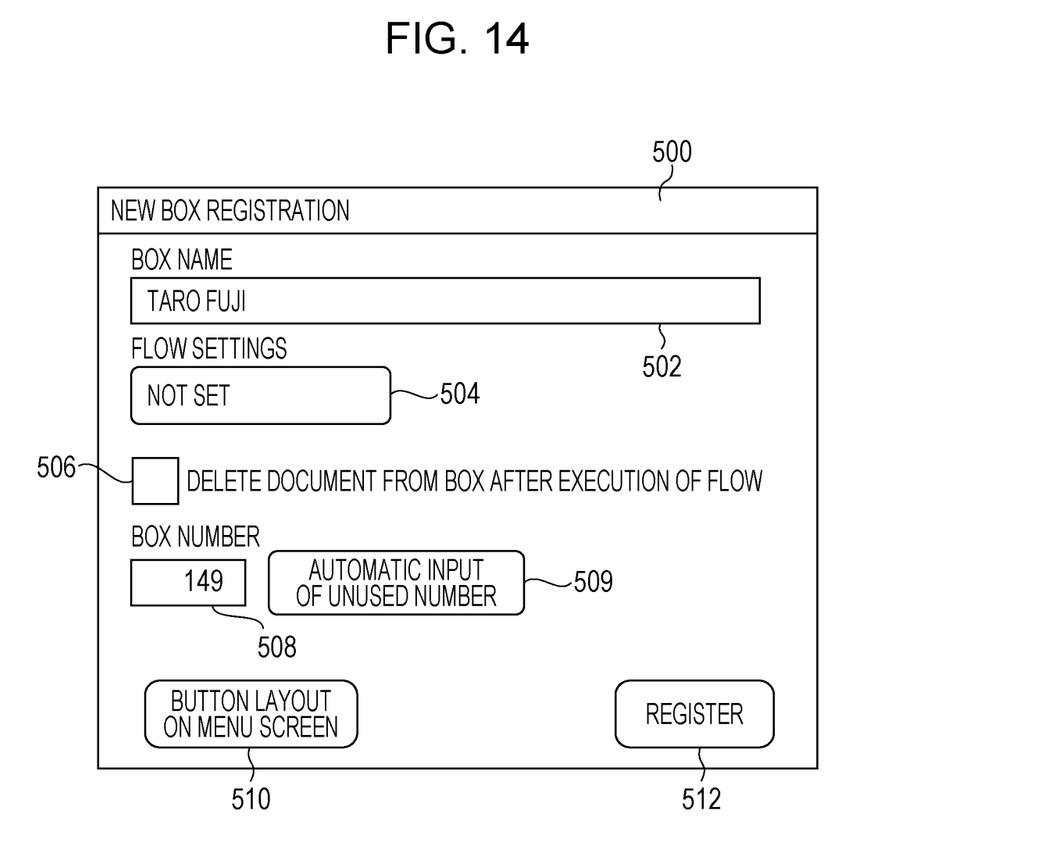
FIG. 14 schematically illustrates an example settings screen for registering a new confidential box.

FIG. 14 illustrates a settings screen 500 for registering a new confidential box. The settings screen 500 is invoked in response to pressing of, for example, a box registration button (not illustrated) on the main menu screen 200.

The settings screen 500 includes a box name input field 502, a flow settings button 504, a checkbox 506, and a number input field 508 (and an automatic input button 509), which are arranged in this order.

The box name input field 502 is designed to accept, from a user, the input of the name of a new confidential box 136 to be registered on the settings screen 500.

The flow settings button 504 is a GUI button for invoking a settings screen (flow settings screen) for a job flow to be associated with the new confidential box 136. A user who is to associate a job flow with the confidential box 136 presses the flow settings button 504 to open a flow settings screen and sets the processing procedure or process parameters of the job flow on the flow settings screen. A flow settings screen similar to a traditional one may be used.

The checkbox 506 is a UI component for accepting the setting of whether to delete data (document) from the confidential box after the job flow set on the flow settings screen invoked by using the flow settings button 504 has been executed on the data (document) in the confidential box. If the checkbox 506 is checked, the control unit 120 (the job flow execution unit 129) deletes the data from the confidential box 136 after the execution of the job flow.

The number input field 508 is a UI component for accepting the input of the box number of the confidential box 136 to be newly registered. New registration requires the input of an unused number to the number input field 508, and the operation of searching for an unused number is time-consuming for the setter. To address this situation, the automatic input button 509 is disposed near the number input field 508.

In response to pressing of the automatic input button 509, the setting management unit 123 selects an unused number and inputs the selected number to the number input field 508. The setting management unit 123 may switch between standards for selecting an unused number in accordance with whether the confidential box 136 to be newly registered is used for the purpose of (a) temporary holding or (b) normal storage (for normal storage purposes, a user gives an instruction to perform a corresponding process on the stored data by using the operation panel 110 or a remote PC) of the data to be subjected to the job flow. For example, the standard described above in which "a larger box number is selected with higher priority" may be used for the case (a), and the standard described above in which "a smaller box number is selected with higher priority" may be used for the case (b).

Which of the cases (a) and (b) is met by the confidential box 136 to be newly registered is determined in accordance with, for example, whether a job flow has been set with the flow settings button 504 and whether the checkbox 506 is checked. For example, if no job flow has been set or if the checkbox 506 is not checked even when a job flow has been set, the case (b) is met and thus the setting management unit 123 selects an unused number in accordance with, for example, the standard in which "a smaller box number is selected with higher priority". If a job flow has been set and the checkbox 506 is checked, the case (a) is met and thus the setting management unit 123 selects an unused number in accordance with, for example, the standard in which "a larger box number is selected with higher priority".

A button layout instruction button 510 is a GUI button that accepts an instruction for laying out on the main menu screen 200 a button for opening the confidential box 136 registered by using the settings screen 500.

When the user inputs the content of the desired settings to the UI components 502 to 510 described above for illustrative purposes and then presses a registration button 512, the setting management unit 123 newly registers the confidential box 136 corresponding to the content of the settings (i.e., registers the content of the settings for the new confidential box 136 in the box management information 134).

The information processing mechanism (the control unit 120 and the storage device 130) of the multifunction machine 100 described above for illustrative purposes is implemented by causing a computer to execute a program indicating the function of the information processing mechanism. The computer has a circuit configuration in which, for example, hardware components, namely, a microprocessor such as a central processing unit (CPU), a memory (primary storage) such as a random access memory (RAM) and a read-only memory (ROM), a controller that controls a fixed storage device such as a hard disk drive (HDD) and a solid state drive (SSD), various input/output (I/O) interfaces, and a network interface that controls connection with a network such as a local area network, are connected via a bus, for example. A disk drive for reading and/or writing data from and/or to a portable disc recording medium such as a compact disc (CD) or a digital versatile disc (DVD), a memory reader/writer for reading and/or writing data from and/or to portable non-volatile recording media of various standards, such as a flash memory, and so on may further be connected to the bus via an I/O interface, for example. A program describing the content of the processes for the functional modules described above for illustrative purposes is saved in a fixed storage device through a recording medium such as a CD or a DVD or via a communication unit such as a network, and is installed into the computer. The program stored in the fixed storage device is read into the RAM and is executed by the microprocessor such as the CPU to implement the functional modules described above for illustrative purposes.

While a description has been given taking the multifunction machine 100 as an example, the function of the settings portal screen 300 or the automatic input button 324 is also applicable to any type of processing apparatus other than the multifunction machine 100. A processing apparatus is an apparatus that executes at least one of various information processing operations and various physical processing operations (such as scanning and printing) on input data or a physical document. Examples of the processing apparatus include a printer, a scanner, a copying machine, a fax apparatus, a kiosk terminal, a PC, and a mobile information terminal.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
    a memory having a plurality of memory areas, the plurality of memory areas including registered memory areas that are registered to be used, and unregistered memory areas that are not registered to be used;
    a processor that stores input data in a corresponding memory area among the plurality of memory areas;
    a setting processor that, in response to an instruction to perform a setting process related to a function which uses a memory area, executes a setting process including registering a memory area selected from among the unregistered memory areas to use the selected memory area for the function or including presenting the selected memory area to a user as a candidate for the memory area used by the function;
    an acceptance unit that displays a selection screen on which icons, each corresponding to one of the plurality of memory areas, are arranged in ascending order of icon display order numbers assigned to the plurality of memory areas and that accepts selection of an icon corresponding to a memory area to be used for an operation from among the icons displayed on the selection screen; and
    a processor that performs a process associated with the target memory area on the data stored in the target memory area,
    wherein the setting processor selects a target memory area into which the input data is to be stored or a candidate for the target memory area from among the unregistered memory areas on the basis of the process associated with the target memory area and on the basis of the icon display order numbers,
    wherein when the process associated with the target memory area comprises a process of a type in which the data stored in the target memory area is deleted from the target memory area after the data has been subjected to the process associated with the target memory area, the setting processor selects a memory area having a larger icon display order number with higher priority from among the unregistered memory areas as the target memory area or a candidate for the target memory area, and
    wherein the plurality of memory areas correspond to a plurality of confidential boxes, and the selected target memory area or the candidate for the target memory area is one of the plurality of confidential boxes.

2. The processing apparatus according to claim 1, wherein the function which uses a memory area comprises a function of storing data input from an input unit in a memory area associated with the input unit.

3. The processing apparatus according to claim 1, wherein when the process associated with the target memory area comprises a process for automatically forwarding or outputting the data stored in the target memory area to an outside location, the setting processor selects a memory area having a larger icon display order number with higher priority from among the unregistered memory areas as the target memory area or a candidate for the target memory area.

4. The processing apparatus according to claim 1, wherein when the target memory area is not associated with a process to be performed on the data stored in the target memory area, the setting processor selects a memory area having a smaller icon display order number with higher priority from among the unregistered memory areas as the target memory area or a candidate for the target memory area.

5. The processing apparatus according to claim 1, wherein when the process associated with the target memory area comprises a process of a type in which the data stored in the target memory area is not deleted from the target memory area after the data has been subjected to the process associated with the target memory area, the setting processor selects a memory area having a smaller icon display order number with higher priority from among the unregistered memory areas as the target memory area or a candidate for the target memory area.

6. The processing apparatus according to claim 1,
wherein when the target memory area is set so that the data stored in the target memory area is not deleted from the target memory area after the data has been subjected to the process associated with the target memory area, the setting processor selects a memory area having a smaller icon display order number with higher priority from among the unregistered memory areas as the target memory area or a candidate for the target memory area.

7. A non-transitory computer readable medium storing a program causing a computer to execute a process for performing processing, the process comprising:
providing a memory having a plurality of memory areas, the plurality of memory areas including registered memory areas that are registered to be used, and unregistered memory areas that are not registered to be used;
storing input data in a corresponding memory area among the plurality of memory areas;
in response to an instruction to perform a setting process related to a function which uses a memory area, executing a setting process including registering a memory area selected from among the unregistered memory areas to use the selected memory area for the function or including presenting the selected memory area to a user as a candidate for the memory area used by the function;
displaying a selection screen on which icons, each corresponding to one of the plurality of memory areas, are arranged in ascending order of icon display order numbers assigned to the plurality of memory areas and that accepts selection of an icon corresponding to a memory area to be used for an operation from among the icons displayed on the selection screen; and
performing a process associated with the target memory area on the data stored in the target memory area,
wherein the setting process includes selecting a target memory area into which the input data is to be stored or a candidate for the target memory area from among the unregistered memory areas on the basis of the process associated with the target memory area and on the basis of the icon display order numbers,
wherein when the process associated with the target memory area comprises a process of a type in which the data stored in the target memory area is deleted from the target memory area after the data has been subjected to the process associated with the target memory area, the setting process including selecting a memory area having a larger icon display order number with higher priority from among the unregistered memory areas as the target memory area or a candidate for the target memory area, and
wherein the plurality of memory areas correspond to a plurality of confidential boxes, and the selected target memory area or the candidate for the target memory area is one of the plurality of confidential boxes.

* * * * *